(No Model.)
E. B. HART.
RECOVERING VOLATILE SOLVENTS WHICH HAVE BEEN USED IN EXTRACTING SOLUBLE MATTER.
No. 253,378. Patented Feb. 7, 1882.
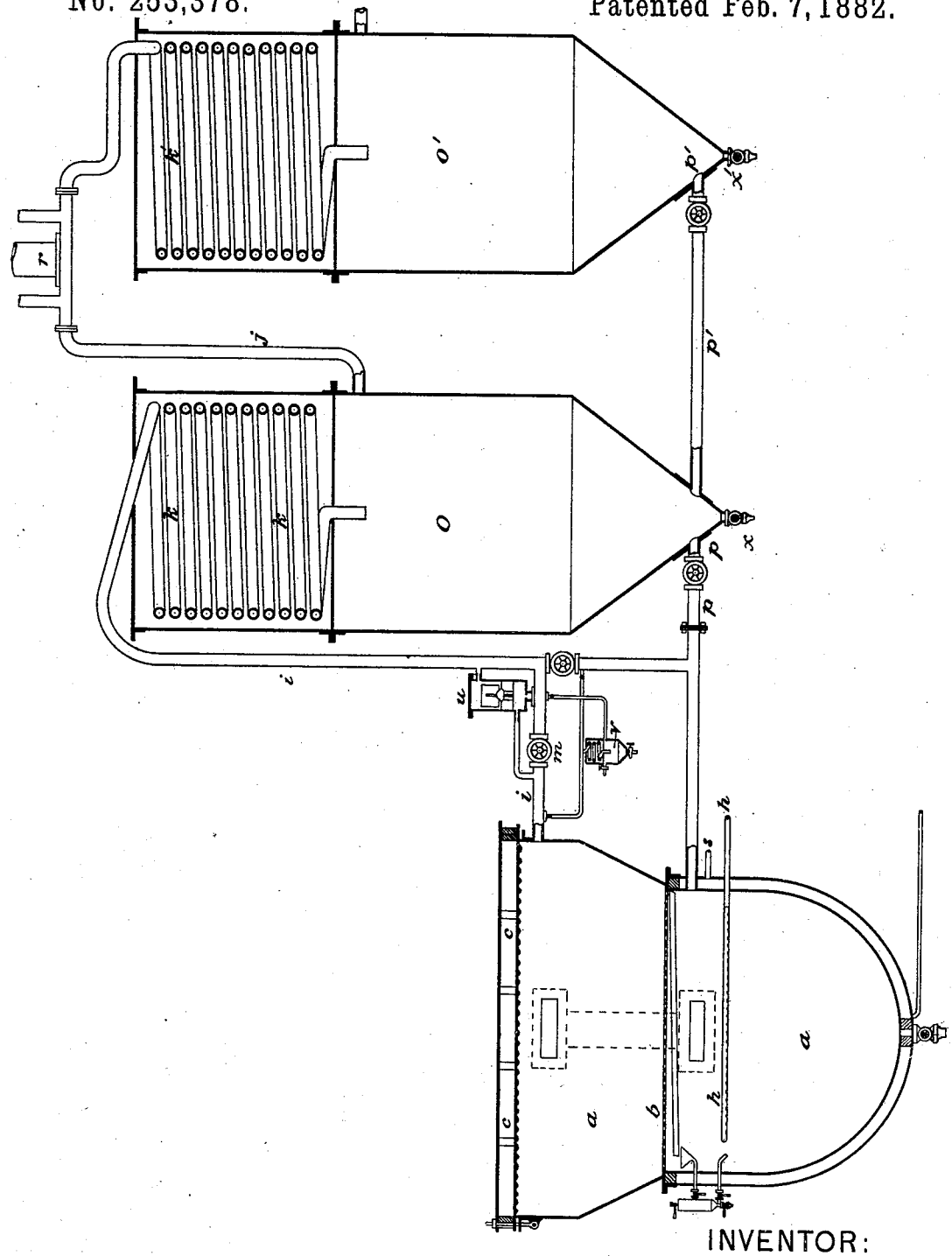
WITNESSES:
INVENTOR:
Edward B. Hart,
By his Attorneys,

UNITED STATES PATENT OFFICE.

EDWARD B. HART, OF STRANDTOWN, BELFAST, IRELAND.

RECOVERING VOLATILE SOLVENTS WHICH HAVE BEEN USED IN EXTRACTING SOLUBLE MATTER.

SPECIFICATION forming part of Letters Patent No. 253,378, dated February 7, 1882.

Application filed September 2, 1881. (No model.)

*To all whom it may concern:*

Be it known that I, EDWARD BUNTING HART, of Strandtown, Belfast, Ireland, have invented certain new and useful Improvements in Recovering Volatile Solvents which have been used in Extracting Soluble Matter from Substances Containing it, of which the following is a specification.

After a substance has been treated with a volatile solvent and its soluble matter thereby extracted a large proportion of the solvent remains, held by absorption in the substance.

The object of my invention is to recover this portion of solvent in a rapid and thorough manner and without injury to the substance under treatment.

To facilitate an understanding of my process, I will first describe the apparatus which I have devised for carrying it out, and which forms part of my invention.

The accompanying drawing shows the apparatus in vertical mid-section.

An extracting-vessel, $a$, of any suitable form, is divided by a filter-bed, $b$, into two compartments, one of which is entered by a steam-pipe, $g$, and the other of which is tapped by an outlet-pipe, $i$, which leads to a condensing-worm, $k$, which worm discharges into a receiving-vessel, $o$. From the vessel $o$ a pipe, $j$, leads to another worm, $k'$, over another receiver, $o'$. There may be one or more condensers $k$ $o$, as required. From the receiver $o'$ a pipe, $p'$, leads back to the receiver $o$, and from thence a pipe, $p$, leads to the lower compartment of the vessel $a$.

The vessel $a$ is or may be steam-jacketed, and has a removable top or cover, $c$, which is also steam-jacketed.

The pipe $i$ is provided with a cock or valve, $m$, and a test-cock, $v$.

The substance from which the soluble matters have been extracted lies in a thick layer on the bed $b$. If its character is such that it can endure a higher temperature than 212° Fahrenheit, and if the solvent used is best volatilized at a higher temperature than that, I proceed as follows: Steam is admitted to the jacket of the cover $c$, whereby that cover is heated preferably to a considerably higher temperature than 212°. Steam is then introduced into the vessel $a$ through the pipe $h$ under sufficient pressure to force it through the mass of substance on the bed $b$ and to cause it to pass out through the pipe $i$ (the valve $m$ being open) and through the worm $k$, and, if any additional condensers be used, through the worm of each. Owing to this pressure the steam is necessarily of a higher temperature than 212°. In passing through the mass of substance the steam volatilizes the absorbent therein and carries the latter off with it through the condenser. The steam, as it rises into the upper compartment of the vessel $a$, circulates therein before passing off through the pipe $i$, and is prevented from condensing by the steam-jacketed cover $c$, which is kept as hot as or hotter than the steam. Were the cover $c$ cold or sufficiently cooler than the steam, more or less of the latter would condense upon it, and the condensed steam would drip or rain back upon the material under treatment, saturating it with moisture and cooling it sufficiently to greatly retard the vaporization of the solvent.

If the substance under treatment be linseed-meal or similar material, the water of condensation upon its surface forms with its upper portion a thick gelatinous paste impervious to the steam and vaporized solvent which tend to rise from below, and soon the steam forces a passage at some point, through which it all passes without permeating the substance, and consequently without extracting the solvent, and the substance, after treatment, contains a large proportion of water.

By my method of heating the cover $c$, on the contrary, all condensation in the vessel $a$ is prevented, the surface of the substance under treatment remains dry and granular, the steam permeates it uniformly, the solvent is thoroughly extracted, and the substance, after treatment, contains but a small percentage of moisture. An attempt has been made to avoid this condensation by superheating the steam; but this method is imperfect because of the high degree of heat required, which, while it burns the substance adjacent to the steam-nozzle, still does not prevent the condensation of the steam in the substance at a short distance therefrom. Thus its action is wanting in uniformity, and the extraction is not thoroughly accomplished, while a portion of the substance under treatment is deteriorated, unless it be of such character that it can resist excessive heat.

In case the substance under treatment is unable to endure a higher temperature than 212°, or in case the solvent used volatilizes readily at a lower temperature than that, I proceed somewhat differently, as follows: By means of a pump or air-exhauster, $r$, connected with the pipe $j$, as shown, or with other suitable part of the apparatus, a rarefaction or partial vacuum is produced in the vessel $a$. Steam is then admitted thereto through the pipe $h$, but not in sufficient quantity to destroy the vacuum. The extent of rarefaction and quantity of steam admitted determine the temperature in the vessel $a$, and will be regulated according to the character of the substance under treatment. The temperature in the vessel $a$ will usually be considerably below 212°, and the temperature of the cover $c$ should only slightly exceed that in the vessel. The steam is drawn by the vacuum through the mass of substance, volatilizing the solvent and carrying it through the condenser or condensers, as before described. By this means the substance under treatment is not subjected to a high temperature, and at the conclusion of the treatment the mass contains so little moisture as to be marketable without afterward drying it.

Previous to my invention volatile solvents have been recovered by merely heating the substance, thereby driving off the solvent in the form of vapor; also by drawing off the solvent by a vacuum without heat, and also by simultaneously heating the substance and creating a suction above it. In neither of these processes is steam used as the vehicle of heat and absorbent for the volatilized solvent, as in my process. By no other means than thorough steam-permeation can most substances be heated to the required temperature uniformly and without danger of burning, and by no other means can all portions of the substance be reached and the vaporization of all the solvent assured.

At the conclusion of my process the solvent is found collected in the receivers $o$ $o'$, from which it may be drawn off through cocks $x$ $x'$.

The test-cock $v$ is to determine when all the solvent has been recovered, as then only water will be obtained.

The solvent employed should have a lower boiling-point than water.

Instead of the discharge-pipe $i$ being above the filter-bed $b$ and the steam-pipe $h$ below it, as shown, this arrangement may be reversed; or the parts may be otherwise arranged, it being only essential that the steam shall be forced to pass through the mass of substance under treatment before it can reach the pipe $i$.

I claim as my invention—

1. The improved process of recovering volatile solvents which have been used in extracting soluble matter from substances containing it, the same consisting in heating the upper part or cover of the vessel inclosing said substance, introducing steam thereinto on one side of said substance, causing said steam to pass through said substance, and conducting it thence from said vessel into and through a condenser, substantially in the manner and for the purposes set forth.

2. The improved process of recovering volatile solvents held in absorption in a substance from which it has been used to extract soluble matter, which consists in heating the upper part or cover of the vessel containing said substance, admitting steam to said vessel on one side of said substance, producing by the action of an air pump or exhauster a partial vacuum in said vessel on the opposite side of said substance, whereby said steam is drawn through the substance, and conducting said steam thence through one or more condensers, substantially as set forth, whereby steam may be used at a less temperature than 212° without condensation.

3. The combination, to form an apparatus for recovering volatile solvents, of a vessel, $a$, a filter-bed, $b$, therein, a steam-jacketed cover or top, $c$, therefor, a steam-pipe, $h$, a pipe, $i$, a condenser, $k$, and a pump or exhauster, $r$, substantially as set forth.

In witness whereof I have hereunto signed my name in the presence of two subscribing witnesses.

EDWARD B. HART.

Witnesses:
 JOHN WHITE,
  168 *York St., Belfast.*
 SAMUEL COURTNEY,
  11 *Bryson St., Belfast.*